United States Patent [19]

Quiring et al.

[11] 4,371,684

[45] Feb. 1, 1983

[54] THERMOPLASTIC POLYURETHANES FOR PROCESSING IN EXTRUDERS AND/OR ON CALENDERS

[75] Inventors: Bernd Quiring, Leverkusen; Georg Niederdellmann, Dormagen; Wilhelm Goyert, Cologne; Hans Wagner, Dormagen, all of Fed. Rep. of Germany

[73] Assignee: Bayer Aktiengesellschaft, Leverkusen, Fed. Rep. of Germany

[21] Appl. No.: 271,308

[22] Filed: May 29, 1981

Related U.S. Application Data

[63] Continuation of Ser. No. 140,074, Apr. 14, 1980, abandoned, which is a continuation of Ser. No. 29,958, Apr. 13, 1979, abandoned.

[30] Foreign Application Priority Data

Apr. 21, 1978 [DE] Fed. Rep. of Germany ....... 2817457

[51] Int. Cl.³ ............................................. C08G 18/42
[52] U.S. Cl. ................................. 528/65; 264/176 R; 528/67; 528/75; 528/76; 528/80; 528/83; 528/85
[58] Field of Search ...................... 528/65, 67, 75, 76, 528/80, 83, 85; 264/176 R

[56] References Cited

U.S. PATENT DOCUMENTS 3,214,411 10/1965 Saunders et al. ..................... 528/44
3,963,679 6/1976 Ullrich et al. ........................ 264/211
3,984,607 10/1976 Thoma et al. ........................ 428/425
4,035,213 7/1977 Thoma et al. ........................ 428/424
4,202,957 5/1980 Bonk et al. ............................ 528/77

*Primary Examiner*—Maurice J. Walsh
*Attorney, Agent, or Firm*—Gene Harsh; Joseph C. Gil; Lyndanne M. Whalen

[57] ABSTRACT

The invention is directed to a process extruding or melt roll calendering thermoplastic polyurethanes wherein the polyurethanes used are synthesized from p1 (a) one or more relatively high molecular weight substantially linear polyols having molecular weights in the range from 400 to 10,000

(b) diphenyl methane and/or hexamethylene diisocyanate and (c) a mixture of 85 to 99% by weight of 1,4-butane diol and 1 to 15% by weight of at least one coextender selected from the group consisting of ethylene glycol, diethylene glycol, triethylene glycol, diethylene 1,2-propane diol, 1,3-butane diol, 1,6-hexane diol, 2-ethyl-1,3-hexane diol, 2,2-dimethyl-1,3-propane diol, 1,4-bis-hydroxymethyl cyclohexane, hydroquinone-bis-hydroxyethyl ether, and mixtures thereof, the equivalent ratio of NCO groups in component (B) to the Zerewitinoff-active hydrogen atoms in components (A) and (C) being from 0.9:1 to 1.2:1 and the molar ratio of component (A) to (C) being from 1:20 to 5:1.

7 Claims, No Drawings

THERMOPLASTIC POLYURETHANES FOR PROCESSING IN EXTRUDERS AND/OR ON CALENDERS

This application is a continuation application of Ser. No. 140,074, filed Apr. 14, 1980, now abandoned, which is a continuation of application Ser. No. 29,958, filed Apr. 13, 1979, abandoned.

BACKGROUND OF THE INVENTION

Conventional polyurethanes intended for thermoplastic processing are generally synthesized from one or optionally more relatively high molecular weight diols, a diisocyanate and a glycol—generally butane diol—as chain extender. These products may be processed very satisfactorily by injection molding. In contrast to this, where processing is carried out in extruders and/or on melt roll calenders, homogeneous melts free from particles which have remained intact are rarely obtained, i.e. only when optimum conditions which have to be determined from case to case are strictly observed. Even minor fluctuations in metering during the production of the thermoplastic polyurethane and minor variations in the extruder or roll temperature during processing are sufficient to lead to a melt heavily permeated by gel particles which, even after cooling, gives products having a rough surface. These gel particles have an adverse effect above all in the case of films. Not only do they have a different refractive index, but they also lead to stresses and, in some cases, to premature cracks in the event of elongation.

Thermoplastic polyurethanes have now been found which, in their homogeneous state, show virtually the same favorable properties as conventional products, but can be processed much more easily by extrusion and/or calendering to form homogeneous melts and then into hardened products having a smooth surface. These polyurethanes are characterized by the fact that a mixture of two low molecular weight diols is used as chain extender during their production. The expression "thermoplastic polyurethane" is abbreviated hereinafter to "TPU."

Although U.S. Pat. No. 3,214,411 describes, in Example 21, a TPU produced with a mixture of approximately 70% of 1,4-butane diol and approximately 30% of diethylene glycol as chain extender, the TPU thus produced has a considerably lower softening range and, on cooling from the melt, distinctly less favorable hardening behavior by comparison with a product produced with butane diol as sole chain extender. In addition, it shows a tendency towards pronounced shrinkage.

DESCRIPTION OF THE INVENTION

The present invention relates to the processing of TPU in extruders or melt roll calenders, the improvement wherein the polyurethanes used are synthesized from (A) one or more relatively high molecular weight, substantially linear polyols having molecular weights in the range from 400 to 10,000 and preferably in the range from 450 to 5000, (b) diphenyl methane diisocyanate and or hexamethylene diisocyanate and (c) a mixture of 85 to 99% by weight, preferably 90 to 98% by weight and, most preferably 92 to 95% by weight of 1,4-butane diol and 1 to 15% by weight, preferably 2 to 10% by weight and, most preferably, 5 to 8% by weight of at least 1 co-chain extender selected from the group consisting of 1,6-hexane diol, ethylene glycol, diethylene glycol, triethylene glycol, neopentyl glycol, 2-ethyl-1,3-hexane diol, 1,3-butane diol, 1,2-propane diol, 1,4-bis-hydroxymethyl cyclohexane, hydroquinone-bis-hydroxyethyl ether, and mixtures thereof, the equivalent ratio of NCO-groups in component (B) to the Zerewitinoff-active hydrogen atoms in components (A) and (C) being from 0.9:1 to 1.2:1 and preferably from 0.93:1 to 1.04:1 and the molar ratio of components (A) to (C) being from 1:20 to 5:1 and preferably from 1:15 to 1:1.

Suitable substantially linear polyols having molecular weights in the range from 400 to 10,000 and preferably in the range from 450 to 5000 include the polyesters, polylactones, polyethers, polythioethers, polyester amides, polycarbonates, polyacetals generally known per se from polyurethane chemistry and preferably containing two and possibly even (in small quantities) three active hydrogen atoms (mainly terminal hydroxyl groups). Also suitable are vinyl polymers such as, for example, polybutadiene diols, polyhydroxyl compounds already containing urethane or urea groups and optionally modified natural polyols or even other compounds containing Zerewitinoff-active groups, such as amino, carboxyl or thiol groups. These compounds are known in the art and are described for example, in German Offenlegungsschriften Nos. 2,302,564; 2,423,764; and 2,549,372 (U.S. Pat. Nos. 3,963,679); 2,402,799; 2,431,846; 2,402,840 (U.S. Pat. No. 3,984,607), and in German Auslegeschrift No. 2,457,387 (U.S. Pat. No. 4,035,213). According to the invention, it is preferred to use hydroxyl-group-containing polyesters of glycols and adipic acid, phthalic and/or terephthalic acid and their hydrogenation products, hydroxyl polycarbonates, polycaprolactones, polyethylene oxide and polypropylene oxide started with glycols, amines and/or water, polytetrahydrofuran and mixed polyethers of ethylene oxide and propylene oxide.

Either pure or commercial-grade diphenyl methane diisocyanate consisting essentially of the 4,4'-isomer or 1,6-hexamethylene diisocyanate is used for producing the polyurethanes used in accordance with the invention. Mixtures of these two diisocyanates may also be used. The polyurethanes may also contain one or more conventional aromatic, heterocyclic, aliphatic, cycloaliphatic or araliphatic diisocyanates, although the diphenyl methane and/or hexamethylene diisocyanate should, generally amount to no less than 70% by weight of the total amount of isocyanate.

Examples of additional polyisocyanates such as these may be found in the publications mentioned above in conjunction with the relatively high molecular weight polyhydroxyl compound.

The chain extender mixture (C) consists essentially of 85 to 99% by weight, preferably 90 to 98% by weight and, most preferably, 92 to 95% by weight of 1,4-butane diol and of 1 to 15% by weight, preferably 2 to 10% by weight and, most preferably, 5 to 8% by weight of at least one second glycol selected from the group consisting of ethylene glycol, di- and tri-ethylene glycol, 1,2-propane diol, 1,3-butane diol, 1,6-hexane diol, 2-ethyl-1,3-hexane diol, 2,2-dimethyl-1,3-propane diol (neopentyl glycol), 1,4-bis-hydroxymethyl cyclohexane and hydroquinone dihydroxyethyl ether. Preferred co-chain extenders are 1,6-hexane diol, ethylene glycol and diethylene glycol, 1,6-hexane diol being particularly preferred.

Monofunctional chain terminators, such as monoalcohols (for example, n-octanol or sec.-butanol), may also be used in the synthesis of the TPU used in accordance with the invention, particularly where it is intended to use trifunctional polyols of relatively high molecular weight. The total functionality of all the polyols used should amount to approximately two. Suitable chain terminators are also mentioned in the publications cited above.

The polyurethanes used in accordance with the invention are produced in known manner by the prepolymer or one-shot processes. The polyurethane is preferably produced in a reaction screw, particularly a twin-screw self-cleaning extruder, in which case the individual reaction components are introduced into the feed zone of the extruder either in premixed form or even separately or are even fed in at various points of the reaction screw. Production processes of this type are described for example in U.S. Pat. Nos. 3,233,025 and 3,642,964, in German Auslegeschrift No. 2,610,980 and, in particular, in German Offenlegungsschriften Nos. 2,302,564; 2,423,764 and 2,549,372 (U.S. Pat. No. 3,963,679).

Some of the polyurethanes used in accordance with the invention are already known. German Auslegeschrift No. 2,402,779 describes polyurethanes synthesized from relatively high molecular weight dihydroxy compounds, diisocyanates and a glycol mixture as chain extender for coating purposes. These polyurethanes are distinguished by particular solubility properties so that the so-called "frostwork effect" can be avoided where they are used for reverse coating. According to German Auslegeschrift No. 2,161,340 (Canadian Pat. No. 972,496), similar polyurethanes (produced with an NCO/OH-ratio of less than one) may be used with advantage as adhesives. There is no reference in any of these publications to improved thermoplastic properties.

However, it has now surprisingly been found that the polyurethanes used in accordance with the invention can be processed much more easily in extruders and on melt calenders than polyurethanes produced with butane diol, for example, as sole chain extender. The flexibility in the choice of the NCO/OH-ratio in the production of the TPU and also in the choice of the processing temperatures in the extruder and/or on the calender is considerably greater. In contrast to standard commercial-grade products containing only one chain extender, it is possible to process two different batches of the same polyurethane under the same conditions. Accordingly, this eliminates the need for the time-consuming and material-consuming search for suitable processing conditions when it comes to changing the TPU batch. In addition, processing machines with greater temperature tolerances may be used.

Providing the preferred quantitative ratios indicated above are used during their production, the polyurethanes used in accordance with the invention are largely comparable in their remaining properties, such as strengths, elasticity, elongation, crystallization behavior and softening point, with products containing 1,4-butane diol as sole chain extender, but otherwise having the same composition. Accordingly, the improvement in processability is not accompanied by any disadvantages. Only where the co-chain extender is used in a proportion of more than 10% is the softening point reduced and greater shrinkage observed.

The products used in accordance with the invention may of course contain additives known per se, such as catalysts, lubricants, stabilizers, fillers, dyes, pigments, other thermoplasts and plasticizers.

In one particular embodiment of the process according to the invention, additives such as these are not worked into the TPU until the final processing step.

The thermoplastic polyurethanes used in accordance with the invention may be processed by extrusion and/or on calenders to form films, hoses, cable sheets, profiles and the like which are characterized by a uniform surface.

The special TPU's may be used in accordance with the invention in any of the processing machines known per se of the type used in practice, such as described for example by H. Domininghaus in "Fortschrittliche Extruder-technik," VDI-Taschenbuch 1970, in the Company Manuals of Zimmer (Offenbach) and Maurer (Berne, Switzerland) and by G. Adank in "Deutsche Textiltechnik" 22 (1972), pages 417–422.

The invention is illustrated by the following Examples in which the quantities quoted represent parts by weight and percentages by weight, unless otherwise indicated.

EXAMPLES

EXAMPLE 1 (Comparison)

A polyurethane synthesized from:

100 parts of polybutane diol adipate (hydroxyl number: 94; acid number: 0.7)

0.9 part of dimethylol polydimethyl siloxane (3% of hydroxyl groups), 10 parts of 1,4-butane diol, 40 parts of 4,4'-diisocyanatodiphenyl methane, 0.7 part of n-octanol and additionally containing 1% by weight of chalk and 0.2% by weight of montan wax, is melted in a planetary roll extruder (for conditions see Table 1). It is not possible to obtain a homogeneous melt, even by varying the rotational speed and barrel temperatures. The melt is delivered to a calender on which it is processed to form a film (for conditions see Table 2). It is not possible under a variety of different conditions to produce a homogeneous film free from gel particles, even by means of the shear forces of the melt roll calender.

EXAMPLE 2

The procedure is as in Comparison Example 1, except that the butane diol used in the synthesis of the polyurethane is replaced by the same quantity of a mixture of 12 parts of 1,4-butane diol and 1 part of 1,6-hexane diol. The product is extruded in a planetary roll extruder [model P 100 of Messrs. Eickoff-Kleinewefers (vormals Schalker), Bochum] to form a homogeneous melt (for conditions see Table 1) which, when further processed on a melt calender (model KM 950 of Messrs. Zimmer-Plastic Offenbach, West Germany; (for conditions see Table 2), gives a homogeneous node-free film (hardness: 88 Shore A; thickness: 0.16 mm; tensile strength: 68 MPa; elongation at break: 1100%).

TABLE 1

Extrusion conditions in a planetary roll extruder during processing of the TPU's of Examples 1 and 2:

| | TPU of Example 2 | TPU of Example 1 |
|---|---|---|
| Feed screw (°C.) | 170 | varies between 160 and 200 |
| Planetary section (°C.) | 165 | |
| Head zone (°C.) | 170 | |
| Exit temperature (°C.) of the melt | 150 | 150–190 |
| rpm | 10 | 10–20 |
| Assessment of the issuing melt | homogeneous | inhomogeneous under any conditions |

TABLE 2

Calendering conditions for further processing the polyurethane melts obtained in the planetary roll extruder:

| | TPU of Example 2 | TPU of Example 1 |
|---|---|---|
| Adjustable roll (°C.) | 180 | varies between 150 and 200 |
| Fixed roll (°C.) | 180 | |
| Take-off rate (m/min.) | 5 | 5 |
| Assessment of the film obtained | homogeneous, smooth | full of gel particles |

Comparison of the processibility of the thermoplastic polyurethanes of Comparison Example 1 and Example 2 clearly shows the superiority of the products used in accordance with the invention.

EXAMPLE 3 (comparison)

A thermoplastic polyurethane synthesized from:
100 parts of a poly-1,4-butane diol adipate (hydroxyl number: 49; acid number: 0.35)
30 parts of 1,4-butane diol,
94.3 parts of commercial-grade 4,4'-diphenyl methane diisocyanate and
0.4 part of ethylene-bis-stearylamide
is extruded in a measuring extruder (Extrusiometer manufactured by the Gottfert Company of West Germany) (for conditions see Table 3).

EXAMPLE 4

A thermoplastic polyurethane differing from the polyurethane described in Comparison Example 3 in that it contains as chain extender a mixture of 27 parts of 1,4-butane diol and 3 parts of diethylene glycol is extruded in the measuring extruder under the conditions shown in Table 3.

TABLE 3

Comparison of the TPU's of Examples 3 and 4 in a measuring extruder (screw compression 1:3). From the feed zone to the discharge nozzle, the barrel is divided into three heating zones.

| | TPU of Example 3 | TPU of Example 4 |
|---|---|---|
| Screw speed (min.$^{-1}$) | 30 | 30 |
| Issuing melt is homogeneous and stable at a barrel temperature of | 195/205/215° C. | 180/190/200° C. to 195/205/215° C. |

As can be seen from Table 3, the thermoplastic polyurethane of Example 4 used in accordance with the invention has a much greater processing temperature range than that of Example 3.

EXAMPLE 5 (Comparison)

A polyurethane elastomer produced in known manner (German Offenlegungsschrift 940,181) from 100 parts of a substantially linear bifunctional polypropylene glycol having an average molecular weight of 2000 (hydroxyl number 56), 100 parts of a hexane diol polycarbonate containing terminal hydroxyl groups and having an average molecular weight of 2000, 24 parts of 1,4-butane diol, 1 part of ethylene-bis-stearyl-amide and the quantity by weight of 4,4'-diisocyanatodiphenyl methane corresponding to the particular NCO/OH-ratio indicated in Table 5 was extruded on an extruder of the S 45 type manufactured by the Reifenhauser Company (West Germany) and fitted with a film blowing head to form a 0.3 mm thick tubular film. The extrusion conditions and results are set out in Table 5. It was only by strictly observing the processing temperatures indicated in a narrow metering range (NCO/OH = 1.01; test 5c) that a satisfactory tubular film could be produced.

EXAMPLE 6

A polyurethane elastomer produced in the same way as in Example 5 contained a mixture of 21.6 parts of 1,4-butane diol and 2.4 parts of 1,6-hexane diol instead of 24 parts of 1,4-butane diol.

Extrusion to form a 0.3 mm thick tubular film (cf. Table 5) resulted in satisfactory quality in a considerably extended metering range (NCO/OH = 1.01 to 1.03; tests 6c to 6e) the establishment of suitable processing temperatures presenting no difficulties and the temperatures quoted in Comparison Example 5 being variable by at least 5° C. in either direction without any adverse effect upon the extrusion behavior.

As shown by a comparison of tests 5a–e and 6a–e in Table 6, the physical property level is not significantly affected by using the diol mixture instead of 1,4-butane diol alone.

TABLE 5

Extrusion of a TPU according to Comparison Example 5 and Example 6

| | | Extrusion conditions | |
|---|---|---|---|
| Example No. | NCO/OH | Barrel temperatures °C. | Head temperatures °C. |
| 5a | 0.99 | 170–180–185–190 | 185–185–175 |
| 5b | 1.00 | 170–180–190–185 | 185–180–175 |
| 5c | 1.01 | 170–180–190–185 | 180–180–170 |
| 5d | 1.02 | 170–180–190–185 | 180–180–170 |
| 5e | 1.03 | no suitable temperature profile adjustable | |
| 6a | 0.99 | 165–175–185–185 | 180–175–165 |
| 6b | 1.00 | 165–175–185–185 | 180–175–165 |
| 6c | 1.01 | 170–180–190–190 | 185–180–165 |
| 6d | 1.02 | 170–180–190–190 | 185–180–170 |
| 6e | 1.03 | 165–175–185–180 | 180–175–165 |

| Example No. | Extrusion pressure kp/cm$^2$ | Tubular film quality |
|---|---|---|
| 5a | 20 | numerous nodes, poor stability under load |
| 5b | 180 | occasional nodes, poor stability under load |
| 5c | 250 | satisfactory |
| 5d | 280 | average node formation |
| 5e | | heavy node formation |
| 6a | 240 | occasional very small nodes |

TABLE 5-continued

Extrusion of a TPU according to Comparison Example 5 and Example 6

| 6b | 350 | almost satisfactory |
|---|---|---|
| 6c | 320 | satisfactory |
| 6d | 320 | satisfactory |
| 6e | 350 | satisfactory |

TABLE 6

Physical properties of Examples 5a-e and 6a-e

| Example No. | Moduli 100% | 300% | Tensile strength (MPa) |
|---|---|---|---|
| 5a | 7.0 | 12.2 | 36.4 |
| 5b | 7.3 | 14.4 | 41.3 |
| 5c | 7.4 | 14.9 | 30.4 |
| 5d | 7.2 | 13.7 | 39.7 |
| 5e | 7.1 | 13.4 | 39.4 |
| 6a | 7.8 | 14.1 | 34.1 |
| 6b | 7.8 | 13.8 | 33.6 |
| 6c | 7.2 | 13.6 | 33.1 |
| 6d | 7.2 | 12.8 | 35.1 |
| 6e | 7.9 | 15.0 | 32.0 |

| Example No. | Elongation at break (%) | Elasticity (%) | Hardness (Shore A) |
|---|---|---|---|
| 5a | 552 | 34 | 88 |
| 5b | 552 | 33 | 88 |
| 5c | 505 | 35 | 87 |
| 5d | 585 | 35 | 87 |
| 5e | 583 | 35 | 87 |
| 6a | 564 | 29 | 88 |
| 6b | 560 | 29 | 87 |
| 6c | 540 | 29 | 87 |
| 6d | 544 | 29 | 87 |
| 6e | 460 | 28 | 88 |

EXAMPLE 7 (Comparison)

A thermoplastic polyurethane synthesized from
100 parts of poly-1,4-butane diol adipate (hydroxyl number: 49; acid number: 0.35),
7.5 parts of 1,4-butane diol and
31.2 parts of 4,4'-diisocyanatodiphenyl methane
is extruded at various temperatures in a measuring extruder (compression 3:1) rotating at 30 rpm (cf. Table 7).

EXAMPLE 8

A thermoplastic polyurethane synthesized in the same way as described in Example 7, except that instead of 7.5 parts of 1,4-methane diol, it contains 7.13 parts of 1,4-butane diol and 0.26 part of ethylene glycol, is extruded at various temperatures in a measuring extruder rotating at 30 rpm (cf. Table 7).

TABLE 7

Comparison of the TPU's of Comparison Example 7 and Example 8 in a measuring extruder

| | TPU of Example 7 | TPU of Example 8 |
|---|---|---|
| Issuing melt stable under load and homogeneous at barrel temperatures of (°C.) | 170/210/220 | 170/195/205 to 170/210/220 |

Table 7 clearly shows that the TPU of Example 8 used in accordance with the invention has a much greater processing temperature range than the TPU of Example 7 corresponding to the prior art.

EXAMPLE 9 (Comparison)

A thermoplastic polyurethane is produced in known manner with the NCO-prepolymer A and the chain extender/catalyst mixture B:

A. Reaction product of:
  100 parts of a polybutane diol adipate (hydroxyl number: 50; acid number: 0.3),
  0.05 parts of 4-methyl-2,6-di-tert.butyl phenyl,
  0.1 part of ethylene-bis-stearylamide,
  0.9 part of n-octanol,
  119.5 parts of hexamethylene diisocyanate, B. Mixture of
  60 parts of 1,4-butane diol,
  20 ppm (based on PUR) of titanium tetrabutylate.

The product is injection-molded to form test specimens of which the properties are shown in Table 8 (injection temperatures up to 200° C.).

EXAMPLE 10

A polyurethane used in accordance with the invention is synthesized in the same way as described in Example 9, except that it additionally contains 2 parts by weight of 1,6-hexane diol and 126.6 parts instead of 119.5 parts of hexamethylene diisocyanate. The test specimens produced by injection molding (temperature up to 200° C.) have the properties shown in Table 8.

TABLE 8

Comparison of the physical properties of the TPU's of Examples 9 and 10 based on hexamethylene diisocyanate:

| | DIN-standard | TPU of Example 9 | TPU of Example 10 |
|---|---|---|---|
| Modulus 100% (MPa) | 53504 | 26.2 | 27.8 |
| Modulus 300% (MPa) | " | 38.9 | 44.2 |
| Tensile strength (MPa) | " | 49.0 | 49.4 |
| Elongation at break (MPa) | " | 438 | 374 |
| Tear propagation resistance (KN/m) | 53415 | 141 | 147.6 |
| Notched impact strength at -30° C. (K Joule/m$^2$) | 53453 | 8.5 | 28.4 |
| Hardness (Shore A/D) | 53505 | 97/61 | 96/59 |
| Elasticity (%) | 53512 | 49 | 45 |
| Abrasion (mm$^3$) | 53516 | 15 | 12 |

Table 8 shows that the physical properties of the polyurethane used in accordance with the invention are not adversely affected by the presence of the co-chain extender; on the contrary, its cold flexibility is even distinctly increased.

On extrusion of the products to form films, the product of Example 10 is found to have a much greater processing range by comparison with the TPU of Example 9.

What is claimed is:

1. In the processing of thermoplastic polyurethanes in extruders and/or melt roll calenders, the improvement wherein the polyurethanes used are synthesized from
  (A) one or more relatively high molecular weight substantially linear polyols having molecular weights in the range from 400 to 10,000 selected from the group consisting of hydroxyl-group-containing polyesters of glycols and adipic acid, phthalic and/or terephthalic acid and their hydrogenation products, hydroxyl polycarbonates, polycaprolactones, polyethylene oxide and polypropylene oxide started with glycols, amines and/or water and polytetrahydrofuran, (B) diphenyl methane diisocyanate and/or hexamethylene diisocyanate and (C) a mixture of 85 to 99% by weight of 1,4-butane diol and 1 to 15% by weight of at least one co-extender selected from the group consisting of ethylene glycol, diethylene glycol, triethylene glycol, diethylene-1,2-propane diol, 1,3-butane diol, 1,6-hexane diol, 2-ethyl-1,3-hexane diol, 2,2-dimethyl-1,3-propane diol, 1,4-bis-hydroxymethyl cyclohexane, hydroquinone-bis-hydroxyethyl ether, and mixtures thereof, the equivalent ratio of NCO groups in component (B) to the Zerewitinoff-active hydrogen atoms in components (A) and (C) being from 0.9:1 to 1.2:1 and the molar ratio of component (A) to (C) being from 1:20 to 5:1.

2. The process of claim 1, characterized in that the ratio of NCO-groups to Zerewitinoff-active groups in components (A) and (C) is from 0.93:1 to 1.04:1.

3. The process of claim 1, characterized in that the ratio by weight of butane diol to co-chain extender is from 98:2 to 90:10.

4. The process of claim 3, characterized in that the ratio by weight of butane diol to co-chain extender is from 95:5 to 92:8.

5. The process of claim 1, characterized in that component (A) is a polyol having average molecular weight in the range from 450 to 5000.

6. The process of claim 1, characterized in that the co-extender is selected from the group consisting of ethylene glycol, diethylene glycol, hexane diol, and mixtures thereof.

7. The process of claim 6, characterized in that the molar ratio of components (A) to (C) is from 1:15 to 1:1.

* * * * *